(12) United States Patent
Kinzel (10) Patent No.: US 6,892,427 B2
(45) Date of Patent: May 17, 2005

(54) RETAINING CLIPS

(75) Inventor: Stanley Grant Kinzel, Calgary (CA)

(73) Assignee: Focus Auto Design, Inc., Calgary (CA)

( * ) Notice: Subject to any disclaimer, the term of this patent is extended or adjusted under 35 U.S.C. 154(b) by 0 days.

(21) Appl. No.: 10/614,017

(22) Filed: Jul. 8, 2003

(65) Prior Publication Data

US 2004/0006855 A1 Jan. 15, 2004

(30) Foreign Application Priority Data

Jul. 8, 2002 (CA) .............................................. 2392748

(51) Int. Cl.[7] .............................................. F16B 2/06
(52) U.S. Cl. ...................................................... 24/289
(58) Field of Search ....................... 24/289–295; 296/91, 296/152, 180.1; 248/231.61; 52/716.5

(56) References Cited

U.S. PATENT DOCUMENTS

| | | | | |
|---|---|---|---|---|
| 2,638,376 A | * | 5/1953 | Berry ........................... | 296/91 |
| 4,052,099 A | * | 10/1977 | Lowery et al. ............... | 296/91 |
| 4,471,991 A | * | 9/1984 | Matthias ...................... | 296/91 |
| 4,518,191 A | * | 5/1985 | Williams et al. ............. | 296/91 |
| 4,836,598 A | * | 6/1989 | Mastin ......................... | 296/91 |
| 4,883,303 A | * | 11/1989 | Gross ........................... | 296/91 |
| 5,067,206 A | | 11/1991 | Metcalfe | |
| 5,172,877 A | | 12/1992 | Hattori et al. | |
| 5,234,247 A | | 8/1993 | Pacer | |
| 5,292,166 A | | 3/1994 | Emery | |
| 5,595,416 A | | 1/1997 | Horwill | |
| 5,630,639 A | * | 5/1997 | Horwill ........................ | 296/91 |
| 5,707,097 A | * | 1/1998 | Horwill ........................ | 296/91 |
| 5,791,719 A | * | 8/1998 | Alley ........................... | 296/91 |
| 5,947,052 A | * | 9/1999 | Deising ....................... | 114/361 |

* cited by examiner

Primary Examiner—James R. Brittain
(74) Attorney, Agent, or Firm—Thomas E. Malyszko

(57) ABSTRACT

A clip for retaining an accessory on an edge of an automobile member has a block element for location adjacent the edge of one side of the automobile member. The clip has a plug for engaging a hole in the accessory and extending into an aperture in the block element, and a jaw for engaging the block element and a second opposed side of the automobile member. The clip is secured to the automobile member's edge by inserting a fastener through the jaw and into the block element and tightening the fastener. The fastener also engages and fixes the plug within the block member, thereby securing the accessory to the block portion and thus to the automobile member's edge.

20 Claims, 5 Drawing Sheets

RETAINING CLIPS

FIELD OF THE INVENTION

The present invention relates to retaining clips in general, and in particular to retaining clips for use with automotive accessories, such as hood deflectors, side window visors and rear hatch air deflectors.

BACKGROUND OF THE INVENTION

Many automotive accessories, such as hood deflectors (also referred to as hood protectors, bug shields, bug deflectors, wind deflectors and the like), side window visors (or vent visors) and rear hatch air deflectors, require mounting to a wide range of motor vehicles, such as passenger automobiles, trucks, sport-utility vehicles ("SUV"), recreational vehicles ("RV") and the like (sometimes also referred to collectively as "cars" or "automobiles"). Aesthetic purposes aside, these deflectors generally function to deflect wind, bugs, stones or other like items away from the vehicle to help avoid chipping or denting of the paint surface or damage to windows and other body elements. Window visors also help draw air out of partially open side windows. To describe the various accessory mounting options currently available, vehicle hood deflectors are a good choice for illustrative purposes. It is noted that protectors made of fabric, such as "hood bras", are not at issue herein.

Although many different designs of non-fabric hood deflectors are available for mounting to various car models, they are commonly made of a planar sheet of plastic or like hard material. There are two basic configurations of hood deflectors. In a first version the main body of the protector extends transversely the width of the hood and longitudinally past (i.e. forward of ) the hood's leading, or free, edge and contours downwardly and rearwardly (or backward) under the leading edge to form a mounting tab or lip generally extending the width of the hood. A series of transversely spaced holes are provided along the mounting tab to accept screws, expansion plugs or other like hardware for mounting into either existing holes beneath the leading edge of the hood or holes drilled by an installer. This system is suited to vehicles having adequate clearance between the hood's leading edge and the top of the radiator grill and headlights to accommodate the mounting tab. A variant of this system provides for the use of two-sided tape or hook and loop material to fasten the mounting tab to the underside of the hood, either with or without additional mechanical assistance.

The second version of hood deflector is similar in structure to the first version but is suited to vehicles where there is adequate clearance between the hood and the grill to accept the deflector's mounting tab, but inadequate clearance between the hood and the tops of the headlights to fit the tab. Hence, in the second version the mounting tab is omitted from the transverse ends or outer portions of the deflector which extend over and past (or behind) the headlights. Typically 8 to 30 inches (about 20 to 75 cm) of each transverse or outer end of the deflector lacks the support of a mounting tab, and so is susceptible to vibration, fluttering and the like during driving. Hence, these transverse portions are provided with some other form of tabs or "end clips" to hold them to the leading edge of the hood.

The existing end clip designs suffer from several disadvantages. Some of the existing clips require a screw or small bolt to extend from above the outside surface of the deflector, thus exposing the head of the screw or bolt or the nut on top of the deflector. This is visually undesirable due to the protrusion of the bulbous screw head and exposure of the screwdriver slots in the screw head. The metal screws are prone to rusting or oxidation, and any protective coatings often peel, chip or discolor.

A second prior art design in use today provides an E-shaped clip forming two channels. The lower channel inserts onto the leading edge of the hood and the other (upper) channels inserts onto the outer portion of the protector. This design is visually undesirable because the top portion of the clip, which is a fairly good sized piece of black nylon or like plastic, and the spine of the clip which extends down and over the leading edge of the hood are clearly visible and disrupt the visual contour of the deflector. The design is also functionally undesirable since some variants employ screws to increase clamping forces, with the resultant disadvantages noted earlier. The clip may also release from the deflector and/or hood due to the wind induced movement and leverage of the deflector during use, or in environments such as car washes.

A third prior art design that no longer enjoys much use is a narrow (i.e. 1 to 2 inch, or 2.5–5 cm) "mini" tab integral with the deflector which wraps under the leading edge of the hood over a headlight. Apart from the same clearance issue noted earlier, this design is prone to breakage from stress concentrations encountered during use. Once such tab is broken, the entire deflector is "scrap" and should be replaced. The visual impact of such tabs, although less obtrusive from the top as the two earlier noted designs, is nonetheless undesirable since the tabs extend forwardly of the edge of the deflector's outer ends and is visually "bulky" and "messy".

What is therefore desired is a novel retaining clip which overcomes the limitations and disadvantages of the existing clips and tabs.

SUMMARY OF THE PRESENT INVENTION

In one aspect the invention provides a clip for retaining an accessory with at least one hole therethrough on an edge of an automobile member having first and second opposed sides comprising:

a block portion adapted to be located adjacent said edge on said first side of said automobile member, and having an aperture-extending thereinto;

a jaw portion adapted to engage said block portion and said second side of said automobile member;

a plug member adapted to extend through said hole and be seated or located within said aperture; and, a fastener for urging said jaw portion toward said block portion for gripping said edge therebetween to retain said clip on said edge, and for engaging said plug member to fix said plug member in said block portion and thereby secure said accessory to said block portion and said automobile member.

BRIEF DESCRIPTION OF THE DRAWING FIGURES

Embodiments of the invention will now be described, by way of example only, with reference to the accompanying drawings, wherein:

FIG. 7b is a front elevational view of the block portion of FIG. 7a;

FIG. 7c is a left side elevational view of the block portion of FIG. 7a;

FIG. 7d is a rear elevational view of the block portion of FIG. 7a;

FIG. 8 is a cross-sectional view in elevation of the block portion along line 8—8 of FIG. 7a;

FIG. 10b is a side view of the pin of FIG. 10a;

DESCRIPTION OF EMBODIMENTS OF THE INVENTION

FIGS. 1 to 10b show a retaining clip (generally designated by reference numeral 30) for mounting automotive accessories, such as hood deflectors, side window visors and rear hatch air deflectors, to a wide variety of automobiles. It will be understood that the clip 30 may also be used for mounting other items unrelated to automobiles onto various structures aside from motor vehicles. However, for ease of reference and illustrative purposes only, the clip will be described herein as used for mounting a hood deflector 10 onto a leading, or free, edge 22 of an automobile hood 20. The hood 20 is typically a thin planar skin of metallic or like rigid material having a painted outside surface 24 and an opposed inside surface 26 attached to a frame (not shown) for structural support. A thin bead of seam sealer 28 typically extends transversely across the inside surface 26 of the hood adjacent the leading edge 22 to define a thickened portion of the hood.

The deflector 10 is typically made of a panel of sheet material, most commonly of a fairly stiff plastic, having opposed top and bottom surfaces 12 and 14, respectively, shaped to follow the contour of the hood. It may have optional features such as a raised trailing edge 16 to enhance deflection of wind, bugs, debris and the like away from the vehicle's front windshield. At least one hole 19 is provided proximate to the deflector's leading edge 18 for mating with the clip 30, as will be described below. As will be appreciated by those skilled in the art, the hole should be spaced a sufficient minimum distance from the edge 18 to avoid cracking and failure of the deflector material between the hole and edge. The hole 19 should be of an appropriate size and shape to effectively mate with the clip 30, as will be apparent later. The hole is shown as oblong in the figures herein.

The clip 30 of the preferred embodiment of the present invention has four main components, namely: a block or body portion 40; a pin or plug 60 for engaging the deflector 10 and passing into the block 40 in a first direction; an L-shaped jaw 70 for engaging the block 40 adjacent a first surface and the bottom surface 14 of the hood; and, a fastener 80 for passing into the block in a second orthogonal direction for engaging the jaw, block and pin.

Figure 8:
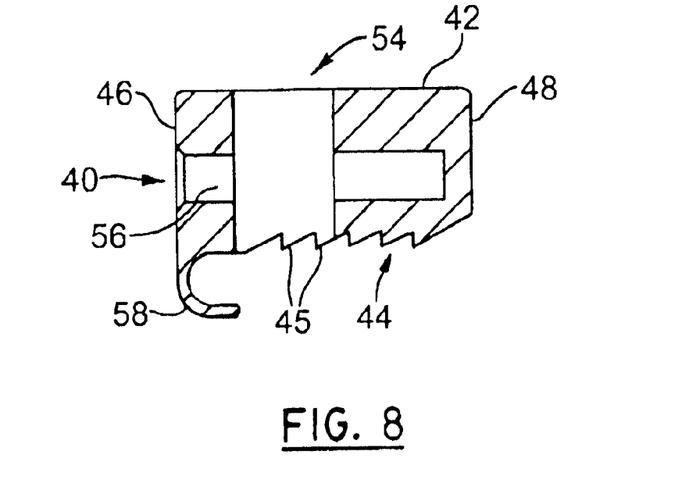
Figure 9:
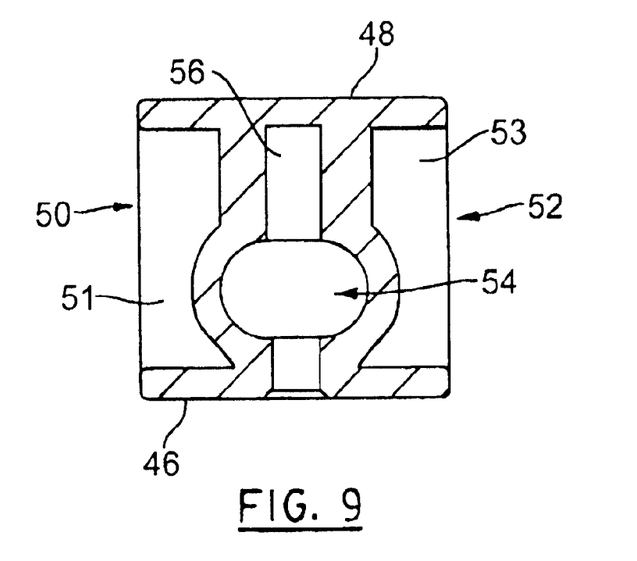
FIG. 9 is a cross-sectional view in plan of the block portion along line 9—9 of FIG. 7b.

Referring now more specifically to FIGS. 7a to 9, the block 40 is preferably formed in an injection molding or other suitable process and is made of plastic or like resilient material which will avoid scratching or otherwise damaging the deflector upon contact. The block has a planar first or upper face 42 and an opposed second or lower face 44 with an optional plurality of gripping teeth 45, a third or front face 46 and an opposed fourth or rear face 48, and a fifth or right side face 50 and an opposed sixth or left side face 52. A first unthreaded aperture 54 extends in the first direction (namely vertically as shown in FIG. 8) through the block between the upper and lower faces 42, 44, and is oblong in horizontal cross-section (FIGS. 7a and 9) to reflect the shape of the pin 60. A second unthreaded aperture 56 extends in a second direction (namely horizontally as shown in FIG. 8) through the block from the front face 46 toward the rear face 48, and preferably does not penetrate the rear face. The vertical and horizontal apertures 54, 56 intersect, preferably generally orthogonally for reasons which will be apparent below. The right and left side faces 50, 52 each have mirror image cavities 51 and 53, respectively, primarily to reduce the weight of the block 40 and the volume of material usage. An optional rearwardly curved nose portion 58 extending from the juncture of the lower and front faces 44, 46 is provided to help locate the block at the leading edge 18 of the hood. The nose portion 58 also acts as an interface between the retaining clip 30 and the hood's leading edge 18 to help avoid scratching, chipping or other damage thereto. A further optional thin and transparent piece of adhesive film 32 (shown in FIG. 3) may be secured about the hood's leading edge 18 as a further protective barrier between the clip and the hood.

Figure 10A:
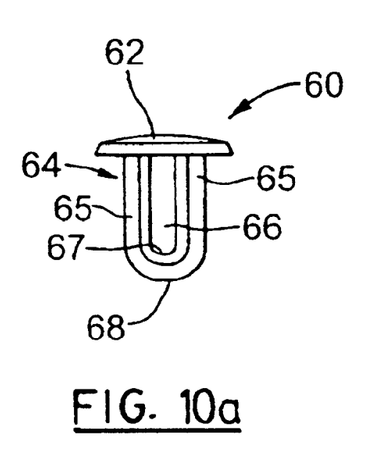
FIG. 10a is an isolated elevational view from the front of a pin of the preferred embodiment of the clip.
Figure 10B:
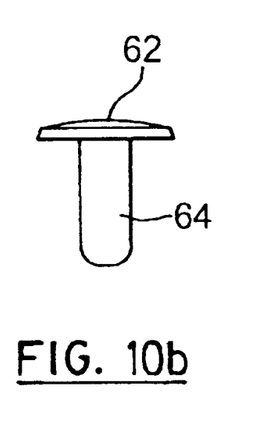

The slotted pin 60 (as best seen in FIGS. 10a and 10b) for holding or interconnecting the deflector to the block 40 has a circular head portion 62 atop an integral elongate shaft portion 64 with a elongate U-shaped slot 66. The head 62 may take a variety of desired shapes, although a low profile is visually preferable. As will be appreciated, the head should be adequately wider or larger than the hole 19 to engage the top surface 12 of the deflector to properly retain the deflector on the block and prevent the pin from being pulled through the hole during use. The shaft 64 has an oblong or elliptical-like perimeter to match the shape of the hole 19 and the vertical aperture 54 in the block so as to align the slot 66 with the block's horizontal aperture 56 when inserted, and thus in alignment with the fastener 80, and is sized to slide freely through the hole 19 and aperture 54. However, the width of the slot 66 (namely, the horizontal distance of the opening between the two parallel upstanding legs 65 as seen in FIG. 10a) should be such that the fastener 80 (e.g. the threads of a screw) bites into the legs 65 when inserted through the slot. A given shaft length will be suitable for a deflector of a given thickness. For instance, a pin having a longer shaft (and corresponding longer slot) will be needed for a thicker truck deflector (say 6 mm thick in the vicinity of the hole 19), and a pin with a shorter shaft should be provided for a thinner passenger car deflector (e.g. 3 mm thick). The configuration of the shaft and slot 66 should allow for some tolerance to local variance in the thickness of the deflector. A slightly thicker deflector should be accommodated by a given pin as long as the trough 67 of the slot is at or below the horizontal aperture 56 to allow the fastener 80 to engage the slot (as explained below). Conversely, a slightly thinner deflector should be accommodated by the same pin as long as the tip 68 of the shaft 64 does not unduly extend past the lower terminus of the vertical aperture 54 and interfere with mounting of the clip to the hood 20.

The L-shaped jaw 70 of the present invention, as best seen in FIGS. 1–5, has a first upstanding arm 72 and an integral second horizontal arm 74 joined at an elbow 76. The upstanding arm 72 has an aperture 73 for alignment with the block's horizontal aperture 56 and for unobstructed passage therethrough of the fastener 80. The aperture is located on the arm 72 such that the block's nose portion 58 is cradled by, or juxtaposed with, the elbow 76 upon securing the jaw 70 to the block 40. The horizontal arm 74 is outwardly bowed so that its free end or tip 75 firmly engages the hood's inside surface 26 with a cantilever-type clamping force at a point of contact some distance away from the leading edge 22 upon mating the upstanding arm 72 with the block 40 via the fastener 80. The bowed shape also avoids or minimizes disturbance of the hood's seam sealer 28 when mounting the clip. The jaw is preferably made of a sturdy metallic material so as to effect a tight clamping force onto the hood, and is coated with a suitable anti-rust material.

The preferred fastener 80 in the first embodiment is a pointed-tip screw coated with a suitable anti-rust material. The screw should be sized so that its threads bite into the walls of the block's horizontal aperture 56 and of the pin's slot 66 when fixing the clip to the hood. The screw preferably does not penetrate beyond the block's rear face 46 when fully engaged. As can be seen from the preceding description, the screw in essence controls the movement of the jaw, and hence the clamping and unclamping of the clip with the hood.

Figure 1:
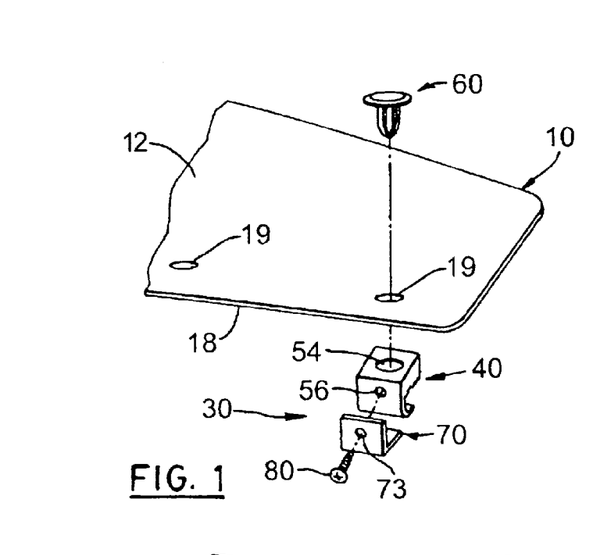
FIG. 1 is a perspective exploded view of a retaining clip according to a preferred embodiment of the present invention showing a method of mounting the clip to a vehicle's hood deflector.
Figure 2:
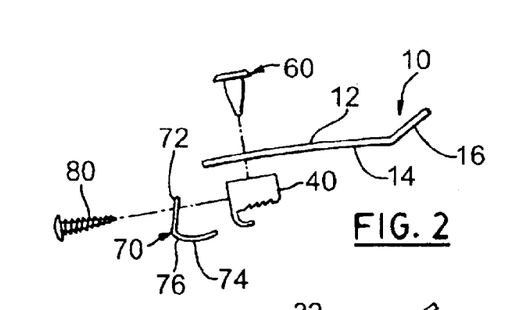
FIG. 2 is a side view of the clip and deflector of FIG. 1.
Figure 3:
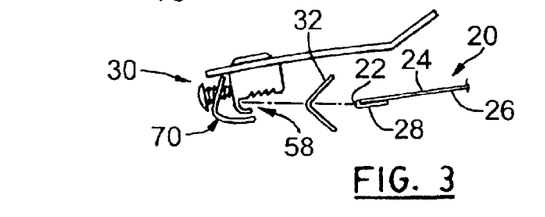
FIG. 3 is a side view similar to FIG. 2 showing the clip and deflector prior to mounting onto the leading edge of vehicle's hood.
Figure 4:
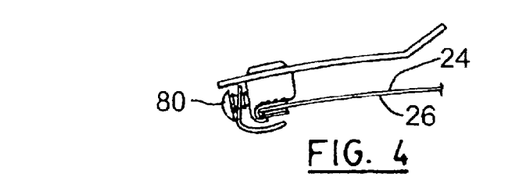
FIG. 4 shows the clip of FIG. 3 engaged with the hood.
Figure 5:
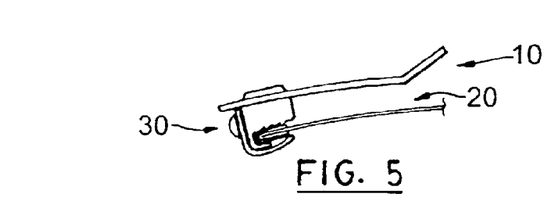
FIG. 5 shows the clip of FIG. 4 secured to the hood.
Figure 6:
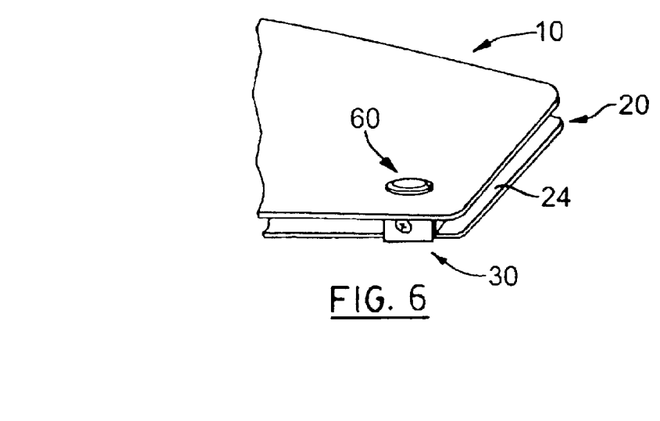
FIG. 6 is a top perspective view showing the deflector and clip secured to the leading edge of the hood.
Figure 7A:
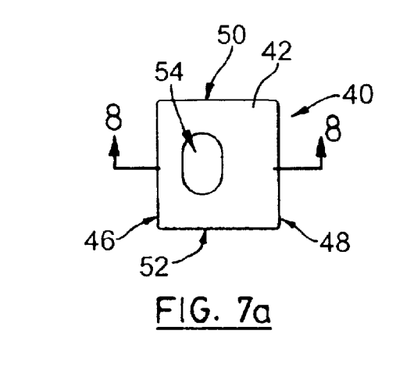
FIG. 7a is an isolated top view of a body or block portion of the preferred embodiment of the clip.
Figure 7B:
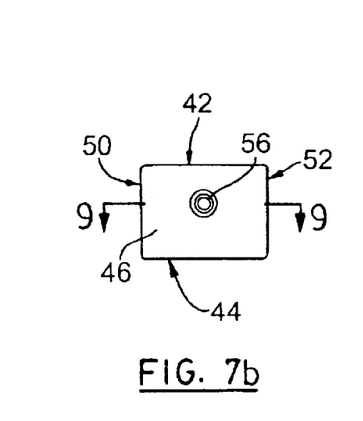
Figure 7C:
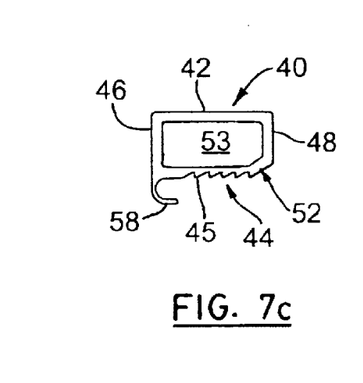
Figure 7D:
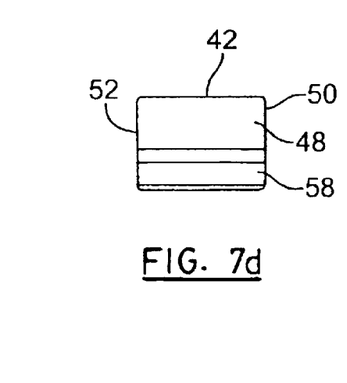

The operation and many advantages of the present invention may now be better understood, with particular reference to FIGS. 1–6. In a preferred sequence of installing the clip, the jaw is first loosely connected to the block 40 by inserting the fastener 80 through the jaw's aperture 73 and screwing it part way into the block's horizontal aperture 56. The block is then held snugly against the deflector's bottom surface 14 beneath the hole 19 so that the pin 60 can be dropped through the hole 19 into the vertical aperture 54. With the pin's head 62 resting on the deflector's top surface 12, the fastener 80 is screwed in further until it bites into the pin's slot 66 to fix the pin and block in place against the deflector (as seen in FIG. 3). At this point the fastener is not yet fully inserted into the block and so the jaw is in a loose "open" position ready for insertion over the hood's leading edge 22 If desired for extra precaution against damage to the hood, a thin adhesive film 32 may now be placed over the hood's leading edge at the desired clamping location. With the jaw open, the block's lower face 44 is slipped over onto the hood's outside surface 24 until the leading edge engages the block's nose portion 58 which acts as a stop to properly locate the clip on the hood. The fastener 80 is then further tightened, as with a screw driver, to start closing the jaw (FIG. 4). As screwing of the fastener in a first horizontal direction brings the jaw's vertical arm 72 into engagement with the block's front face 46, the jaw's horizontal arm 74 is brought upwardly in a second direction into a tight clamping engagement with the hood's inside surface 26 (FIG. 5). The point of contact is primarily by the tip 75 of the jaw at a distance away from the hood's leading edge 22 behind the bead of seam sealer 28. Upon completion of the mounting of the deflector, the clips are substantially hidden from view (FIG. 6).

In a slight variation of the above mounting method, the block may first be located at the leading edge of the hood (optionally over the prior placed adhesive film 22), the deflector is placed over the block so as to align the hole 19 with the block's vertical aperture 54, and the pin 60 is inserted through the hole and aperture. As this arrangement is held in place, the jaw is positioned adjacent the block and the fastener is screwed into the block's horizontal aperture 56 to effect the desired clamping (FIGS. 4 and 5).

Figure 11:
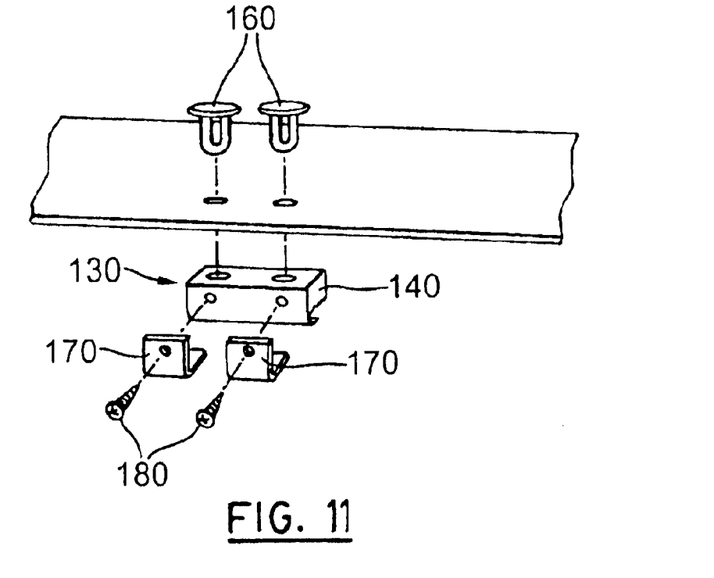
FIG. 11 is a perspective view of another embodiment of the present invention; and, FIG. 12 is a perspective view of yet another embodiment of the present invention.
Figure 12:
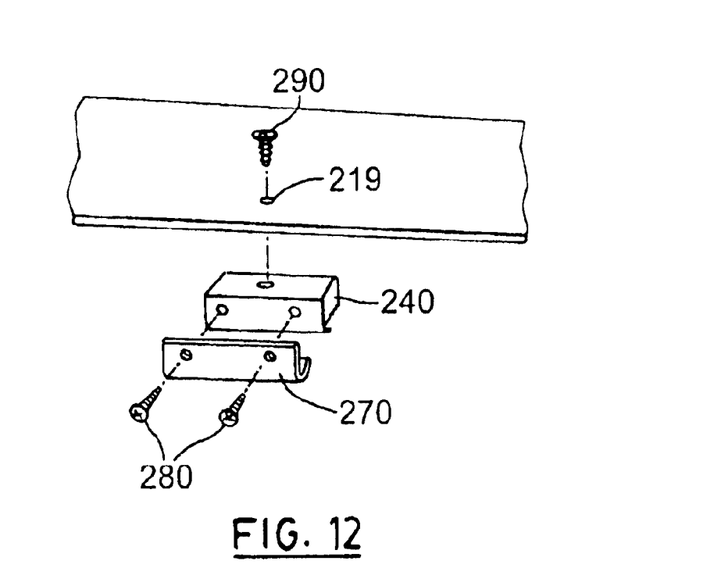

Some alternate embodiments of the present invention are shown in FIGS. 11 and 12. Reference numerals with the prefix "1" or "2" are used to identify like elements from the first embodiment. In the FIG. 11 version the clip 130 is the equivalent of integrating two clips 30 side-by-side. Hence, the block 140 is adapted to accept two sets of pins 160, jaws 170, and fasteners 180. This embodiment is suitable where a greater clamping force is required, for instance with a larger and heavier deflector. In the FIG. 12 version the block 240 is wider than the block 40 of the preferred embodiment, and so a wider jaw 270 is provided requiring two fasteners 280. The dual pin arrangement (as used in the FIG. 11 version) is substituted herein by a single screw 290 which clamps the deflector to the block via one hole 219 rather than two. While the use of screw 290 may be an effective alternative to fixing the deflector to the block 240 (and hence to the hood), it is not preferred for aesthetic and other reasons outlined earlier.

It will be appreciated that the clip design may be altered if necessary, such as varying the height of the block 40, to accommodate the mounting of other vehicle accessories, such as side window visors and rear hatch air deflectors.

The many advantages or the present invention may now be appreciated and are outlined below.

The clamping lower jaw 70 opens and closes with the action of the screw 80. Hence, the jaw may be opened wider than prior art clips to slip over the leading edge of the hood with little or no disturbance and damage to the seam sealer 28, and is then clamped tightly behind the seam by merely fastening the screw. In contrast, the prior art clips currently in use rely on a lower jaw with a fixed gap which must be forced over the edge of the hood and held in place with a friction fit. Unfortunately, the materials of such clips loose strength over time, and so the clips loosen and can not be tightened. As these clips must be stiff and tight enough to provide the noted friction fit, they often tear the sealant and paint during insertion over the hood's leading edge. Further, the lower plastic jaws are necessarily thick to provide the desired stiffness for the friction fit, which requires a greater clearance below the edge of the hood that certain car models lack.

The clip 30 of the present invention may accommodate hoods of differing thickness. The clip may be tightened equally well on aluminum hoods which are thicker than typical sheet metal hoods, as well as on hoods made of fiberglass. In contrast, prior clips are only suitable for a preset hood thickness.

Due to the configuration of the present invention, the jaw 70 is preferably made of steel for greater strength, and has a thinner profile, therefore requiring less clearance under the hood for mounting the clip 30. The steel jaw is also less prone to fatigue and loosening over time. Further, the present design allows for a selection of metallic or other materials to be employed for the jaw (and for the other components), such as stainless steel, or alternately to save costs, regular mild steel with a rust resistant coating. Even if such coating deteriorates over time, the mounted jaw is substantially hidden from view.

The clip design of the present invention does not require that the leading edge of the deflector be wrapped under the hood. Since the present clip in essence sits under the deflector, the clip does not dictate where the leading edge of the deflector must end. Hence, the deflector holes 19 may be located such that the deflector's leading edge extends past the hood's leading edge by up to 0.5 inch (1.25 cm) or more. Such extension should result in better coverage and protection of the hood's leading edge, and the clip is even less visible to the casual viewer. It will therefore be further appreciated that the present clip allows for the complete omission of the conventional deflector mounting tab which contours under the hood. As many clips as necessary may be used to provide a desired clamping force.

The above description is intended in an illustrative rather than a restrictive sense, and variations to the specific configurations described may be apparent to skilled persons in adapting the present invention to other specific applications. Such variations are intended to form part of the present invention insofar as they are within the spirit and scope of the claims below. For example, the block 40 and pin 60 may be made of metal instead of plastic, although this is not preferred so as to avoid damaging to the deflector and the visible surface of the hood.

I claim:

1. A clip for retaining an accessory with at least one hole therethrough on an edge of an automobile member having first and second opposed sides comprising:
   a block portion adapted to be located adjacent said edge on said first side of said automobile member, and having first and second intersecting apertures extending thereinto in first and second non-aligned directions respectively;
   a jaw portion adapted to engage said block portion at said second aperture and said second side of said automobile member;
   a plug member adapted to extend through said hole and be seated within said first aperture; and,
   a fastener adapted to project along said second aperture and across said first aperture to mate with said plug member for urging said jaw portion toward said block portion to grip said edge therebetween and retain said clip on said edge, and to fix said plug member in said block portion and thereby secure said accessory to said block portion and said automobile member.

2. The clip of claim 1 wherein said first and second apertures intersect orthogonally.

3. The clip of claim 1 wherein said block portion further includes stop means to aid in proper location of said block portion at said edge of said automobile member.

4. The clip of claim 3 wherein said stop means comprises an elongate planar nose portion extending from said block portion adapted to engage said edge.

5. The clip of claim 1 wherein said fastener is adapted to thread into said second aperture and said plug member.

6. A clip for retaining an accessory with at least one hole therethrough on an edge of an automobile member having first and second opposed sides comprising:
   a block portion adapted to be located adjacent said edge on said first side of said automobile member, and having a first aperture extending thereinto in a first direction;
   a jaw portion adapted to engage said block portion and said second side of said automobile member;
   a plug member adapted to extend through said hole and be received within said first aperture; and,
   a fastener adapted to project through said block portion in a second direction orthogonally to said first direction and mate with said plug member for urging said jaw portion toward said block portion to grip said edge therebetween and retain said clip on said edge, and to fix said plug member in said block portion and thereby secure said accessory to said block portion and said automobile member.

7. The clip of claim 6 wherein said block portion further includes an elongate nose portion to aid in proper location of said block portion at said edge.

8. A clip for retaining an accessory with at least one hole therethrough on an edge of an automobile member having first and second opposed sides comprising:
   a block portion adapted to be located adjacent said edge on said first side of said automobile member, and having a first aperture extending thereinto in a first direction from a first face toward a second face of said block portion;
   a jaw portion adapted to engage said block portion on a third face of said block portion and said second side of said automobile member;
   a plug member adapted to extend through said hole and be received within said first aperture; and,
   a fastener adapted to project from said third face of said block portion thereinto across said first aperture and mate with said plug member.

9. The clip of claim 8 wherein said fastener projects in a second direction orthogonally to said first direction.

10. The clip of claim 8 wherein said block portion further includes an elongate nose portion to act as a stop for locating said block portion at said edge.

11. A clip for retaining an accessory with at least one hole therethrough on an edge of an automobile member having first and second opposed sides comprising:
    a block member adapted to be located adjacent said edge on said first side of said automobile member, and having an a block aperture extending thereinto;
    an L-shaped jaw having a first arm with a jaw aperture therethrough adapted to engage said block member, and a second arm joined to said first arm adapted to engage said second side of said automobile member;
    a plug member adapted to extend through said hole and be seated within said block aperture; and,
    a fastener for extending through said jaw aperture and into said block member to urge said first arm in a first direction toward said block member into engagement therewith and said second arm in a second direction toward said black member into clamping engagement with said second side of said automobile member.

12. The clip of claim 11 wherein said fastener engages said plug member generally orthogonally thereto to fix said plug member in said block member.

13. The clip of claim 11 wherein said first arm is oriented generally perpendicular to said second arm.

14. The clip of claim 13 wherein said second arm is bowed so that a distal end thereof engages said second side of said automobile member away from said edge.

15. The clip of claim 11 wherein said block portion further includes an elongate nose portion for locating said block member at said edge.

16. A clip for retaining an accessory with at least one hole therethrough on an edge of a structure comprising:
    a block portion having an aperture extending thereinto;
    a jaw portion adapted to engage said block portion and said structure;

a plug member having a shaft portion with an elongate slot therein and adapted to extend through said hole and be received within said aperture; and, a fastener for urging said jaw portion toward said block portion for gripping said edge therebetween to retain said clip on said edge, and for engaging said slot to fix said plug member in said block portion and thereby secure said accessory to said block portion and said structure.

17. The clip of claim 16 wherein said aperture of said block portion and said shaft of said plug member have complimentary profiles to align said slot with said fastener when said plug member is seated within said aperture.

18. The clip of claim 17 wherein said profiles are elliptical.

19. The clip of claim 16 wherein said fastener engages said slot generally orthogonally to said shaft portion of said plug member.

20. The clip of claim 16 wherein said block portion has a nose portion for aiding in proper location of said block portion relative to said edge.

* * * * *